(12) United States Patent
Pierce

(10) Patent No.: US 7,152,110 B2
(45) Date of Patent: Dec. 19, 2006

(54) INFORMATION EXCHANGE BETWEEN NON-NETWORKED DEVICES THROUGH AN INTERMEDIARY DEVICE VIA A PICONET

(75) Inventor: Shaun D. Pierce, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 794 days.

(21) Appl. No.: 09/681,510

(22) Filed: Apr. 18, 2001

(65) Prior Publication Data

US 2002/0156861 A1    Oct. 24, 2002

(51) Int. Cl.
| | |
|---|---|
| G06F 15/16 | (2006.01) |
| G06F 15/167 | (2006.01) |
| G06F 13/00 | (2006.01) |
| G06F 13/36 | (2006.01) |
| H04B 7/00 | (2006.01) |

(52) U.S. Cl. .................. 709/227; 709/213; 709/229; 709/249; 710/110; 710/306; 370/310

(58) Field of Classification Search ............... 709/203, 709/208, 211–213, 219, 227–229, 249, 250; 710/110, 306; 370/310
See application file for complete search history.

(56) References Cited

U.S. PATENT DOCUMENTS

| | | | | |
|---|---|---|---|---|
| 6,026,297 A | * | 2/2000 | Haartsen | 455/426.1 |
| 6,452,910 B1 | * | 9/2002 | Vij et al. | 370/310 |
| 6,512,935 B1 | * | 1/2003 | Redi | 455/574 |
| 6,532,368 B1 | * | 3/2003 | Hild et al. | 455/515 |
| 6,553,236 B1 | * | 4/2003 | Dunko et al. | 455/457 |
| 6,590,928 B1 | * | 7/2003 | Haartsen | 375/134 |
| 6,604,140 B1 | * | 8/2003 | Beck et al. | 709/226 |
| 6,631,410 B1 | * | 10/2003 | Kowalski et al. | 709/224 |
| 6,640,222 B1 | * | 10/2003 | Briancon | 707/3 |
| 6,650,871 B1 | * | 11/2003 | Cannon et al. | 455/41.2 |
| 6,664,891 B1 | * | 12/2003 | Davies et al. | 340/505 |
| 6,668,173 B1 | * | 12/2003 | Greene | 455/445 |
| 6,676,524 B1 | * | 1/2004 | Botzas | 463/43 |
| 6,683,886 B1 | * | 1/2004 | van der Tuijn et al. | 370/458 |
| 6,691,173 B1 | * | 2/2004 | Morris et al. | 709/249 |
| 6,701,378 B1 | * | 3/2004 | Gilhuly et al. | 709/249 |
| 6,704,293 B1 | * | 3/2004 | Larsson et al. | 370/255 |
| 6,748,195 B1 | * | 6/2004 | Phillips | 455/41.2 |

(Continued)

FOREIGN PATENT DOCUMENTS

WO    WO 2079921 A2 * 10/2002

OTHER PUBLICATIONS

Kardach, James. "Bluetooth Architecture Overview", Intel Technology Journal, Q2, 2000, pp. 1-7.*

(Continued)

*Primary Examiner*—Jason Cardone
*Assistant Examiner*—Melvin H. Pollack
(74) *Attorney, Agent, or Firm*—Lee & Hayes, PLLC

(57) ABSTRACT

Information exchange among non-networked devices is disclosed. The information exchange occurs through instantaneous networks, like piconets, established between the non-networked devices and an intermediary device. For example, the intermediary device receives information from a first device during a piconet including it and the first device. This piconet dissipates, and another piconet is established between the intermediary device and a second device. During this piconet, the intermediary provides the information it received from the first device to the second device. The second device has received information from the first device, even though these devices have not networked themselves in an ad hoc network like a piconet or a scatternet.

40 Claims, 8 Drawing Sheets

U.S. PATENT DOCUMENTS

| | | | | |
|---|---|---|---|---|
| 6,751,200 | B1* | 6/2004 | Larsson et al. | 370/255 |
| 6,754,250 | B1* | 6/2004 | Haartsen | 375/132 |
| 6,754,484 | B1* | 6/2004 | Hiltunen et al. | 455/412.1 |
| 6,757,318 | B1* | 6/2004 | Ziegler et al. | 375/133 |
| 6,757,518 | B1* | 6/2004 | Spratt et al. | 455/11.1 |
| 6,763,012 | B1* | 7/2004 | Lord et al. | 370/338 |
| 6,775,258 | B1* | 8/2004 | van Valkenburg et al. | 370/338 |
| 6,778,809 | B1* | 8/2004 | Morimoto | 455/11.1 |
| 6,870,822 | B1* | 3/2005 | Balogh | 370/332 |
| 6,892,230 | B1* | 5/2005 | Gu et al. | 709/220 |
| 7,016,351 | B1* | 3/2006 | Farinacci et al. | 370/392 |
| 2001/0023446 | A1* | 9/2001 | Balogh | 709/229 |
| 2001/0033554 | A1* | 10/2001 | Ayyagari et al. | 370/328 |
| 2002/0007406 | A1* | 1/2002 | Arunachalam | 709/219 |
| 2002/0010781 | A1* | 1/2002 | Tuatini | 709/227 |
| 2002/0069278 | A1* | 6/2002 | Forslow | 709/225 |
| 2002/0073204 | A1* | 6/2002 | Dutta et al. | 709/227 |
| 2002/0087652 | A1* | 7/2002 | Davis et al. | 709/213 |
| 2002/0091855 | A1* | 7/2002 | Yemini et al. | 709/238 |
| 2002/0116483 | A1* | 8/2002 | Ullmann | 709/223 |
| 2002/0143966 | A1* | 10/2002 | Sibecas et al. | 709/229 |

OTHER PUBLICATIONS

Gifford, Ian, et al. "IEEE Approves IEEE 802. 15.1 Standard for Wireless Personal Area Networks Adapted from the Bluetooth Specification," IEEE Standards Announcement, pp. 1-3.*

Specification of the Bluetooth System, vol. 1, v1.0B, Dec. 1, 1999, pp. 1-14 and 323-384.*

Wireless LAN Medium Access Control (MAC) and Physical Layer (PHY) Specifications, IEEE Standards 802.11 and 802.11b, 1999, covers, introductions, and tables of contents.*

Yih-Chun Hu and David B. Johnson. "Caching Strategies in On-Demand Routing Protocols for Wireless Ad Hoc Networks," Proceedings of the Sixth Annual International Conference on Mobile Computing and Networking (MobiCom 2000), ACM, Boston, MA, Aug. 2000.*

Tan, Godfrey, et al. "Forming Scatternets from Bluetooth Personal Area Networks," MIT-LCS-TR-826, Oct. 2001, pp. 1-11.*

Ko, Young-Bae, and Vaidya, Nitin H. "Geocasting in Mobile Ad Hoc Networks: Location-Based Multicast Algorithms," 2nd IEEE Workshop on Mobile Computing Systems and Applications, Feb. 25-26, 1999, pp. 101-110.*

Lee, Seungjoon, and Kim, Chongkwon. "Neighbor Supporting Ad Hoc Multicast Routing Protocol," 1st ACM Intl. Symposium on Mobile Ad Hoc Networking and Computing, 2000, pp. 37-44.*

Liu, Mingyan, et al. "AMRoute: Adhoc Multicast Routing Protocol," SCHCN Technical Research Report, 1999, pp. 0-14.*

Marvaez, Paolo et al. "New Dynamic Algorithms for Shortest Path Tree Computation," IEEE/ACM Transactions on Networking (TON), vol. 8, Issue 6, Dec. 2000, pp. 734-746.*

Corson, S. and Macker, J. "Mobile Ad Hoc Networking (MANET): Routing Protocol Performance Issues and Evaluation Considerations," RFC 2501, Jan. 1999, pp. 1-12.*

Coltun, R. "The OSPF Opaque LSA Option," RFC 2370, Jul. 1998, pp. 1-15.*

* cited by examiner

INFORMATION EXCHANGE BETWEEN NON-NETWORKED DEVICES THROUGH AN INTERMEDIARY DEVICE VIA A PICONET

BACKGROUND OF INVENTION

This invention relates generally to devices having ad hoc networking capability, and more particularly to information exchanged between such devices within piconets.

There has been much promotion of devices that include ad hoc networking capability. Ad hoc networks are rapidly deployable, and function without infrastructure support. An ad hoc network is one in which the devices can communicate with each other as they come within range of each other, without prior networking setup. Devices can join and leave an ad hoc network on an ongoing basis. When there is only one device left, the ad hoc network dissipates as quickly as it was created.

An example of an ad hoc network is a laptop computer that has ad hoc networking capability sending a document to a printer that has also ad hoc networking capability. Once the laptop computer has moved within range of the printer, the ad hoc network comes into existence. The computer can print documents on the printer, and when it moves out of range, the network ceases to exist.

Ad hoc networks are enabled by specific communication hardware. One type of such hardware is known as Bluetooth. Bluetooth connectivity enables devices that have this type of hardware to create ad hoc networks with other devices that have Bluetooth connectivity. The range of Bluetooth-enabled devices is quite limited, and is measured by tens of feet. Another type of such hardware is known as the 802.11b standard. Unlike Bluetooth, 802.11b-enabled devices have a longer range, which is measured by hundreds of feet.

Ad hoc networks can be more specifically divided into two categories: piconets, and scatternets. All the devices within a piconet are within range of one another. For example, if there are three devices in a given piconet, the first device can directly communicate with the second and third devices. Likewise, the second device can directly communicate with the first and third devices, and the third device can directly communicate with the first and second devices.

Scatternets, on the other hand, are made up of two or more piconets with at least one device in common. For example, the devices within one piconet communicate with the devices within another piconet through one of the intermediary devices in common with both piconets. There may be a first piconet with a first device and a second device, and a second piconet with the second device and a third device. The first device can only communicate with the third device through the second piconet, because the first device is not within the range of the third device. This communication methodology is known as store and forward, where information is communicated over multiple hops.

A disadvantage to current ad hoc networking implementations is that information can only be exchanged among devices where a piconet or a scatternet is currently in existence. For example, there may be four devices. If the first device comes into range with the second device at the same time the second device is in range with the third device, then the first device can communicate with the second device through a piconet and with the third device through a scatternet. However, even if the second device had earlier been in a piconet with the fourth device, which has since moved out of range, the first device cannot receive information from the fourth device. Because the fourth device is not simultaneously in a piconet or a scatternet with the first device, the first device cannot exchange information with the fourth device.

For this and other reasons, therefore, there is a need for the present invention.

SUMMARY OF INVENTION

The invention relates to information exchange among devices that are not currently in a network with one another. The information exchange occurs through instantaneous networks established between the non-networked devices and an intermediary device. The intermediary device receives information from a first device during an instantaneous network including it and the first device. After this network dissipates, another instantaneous network is established between the intermediary device and a second device. During this network, the intermediary provides the information it received from the first device to the second device. The second device therefore has received information from the first device, even though these devices have not simultaneously networked themselves in an ad hoc network like a piconet or a scatternet.

An instantaneous network is a network between two or more devices, where the two devices specifically communicating with one another are in an ad hoc network, such as a piconet or a scatternet. That is, a first device and a second device in an instantaneous network may be in a piconet or in a scatternet with one another. However, there may be other devices with which the first and the second devices are networked by more conventional, non-ad hoc networks, such as Ethernet networks, the Internet, intranets, extranets, and so on. The technology enabling the instantaneous network may be Bluetooth, or another type of technology.

Once an instantaneous network has been established between the second device and the intermediary device, the devices exchange information. The second device may provide the intermediary device with identity information regarding itself. The intermediary device may provide the second device with identity information regarding itself, and also identity information regarding the first device with which it had earlier established an instantaneous network. The second device, therefore, now has identity information regarding the intermediary device and the first device. While the second device received the identity information of the intermediary device through an instantaneous network with this device, it received the identity information of the first device without establishing an ad hoc network with the first device.

The information that is exchanged among devices can be stored in a data structure, such as a tree, according to a markup language, such as the eXtensible Markup Language (XML). The information in such instance is divided into nodes. Each node may contain, for example, the identity information of a particular device. Each node also contains decay information, indicating when the node and the information it contains should be deleted. Information decay ensures that a given device does not become overloaded with information. A node may decay after a predetermined length of time after a device receives the information contained in the node. Alternatively, the node may decay after a predetermined length of time after another device that initially received the information. Thus, exchange of particular information from one device to another occurs before the information has decayed and been deleted.

In addition to those described in this summary, other aspects, advantages, and embodiments of the invention will become apparent by reading the detailed description, and referencing the drawings.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, electrical, and other changes may be made without departing from the spirit or scope of the present invention. The following detailed description is, therefore, not to be taken in a limiting sense, and the scope of the present invention is defined only by the appended claims. For instance, the invention is substantially described in the detailed description as to instantaneous networks that are piconets. However, the description is also applicable to other types of instantaneous networks, such as scatternets, and so on.

Information Exchange Between Non-Networked Clients

Figure 1:
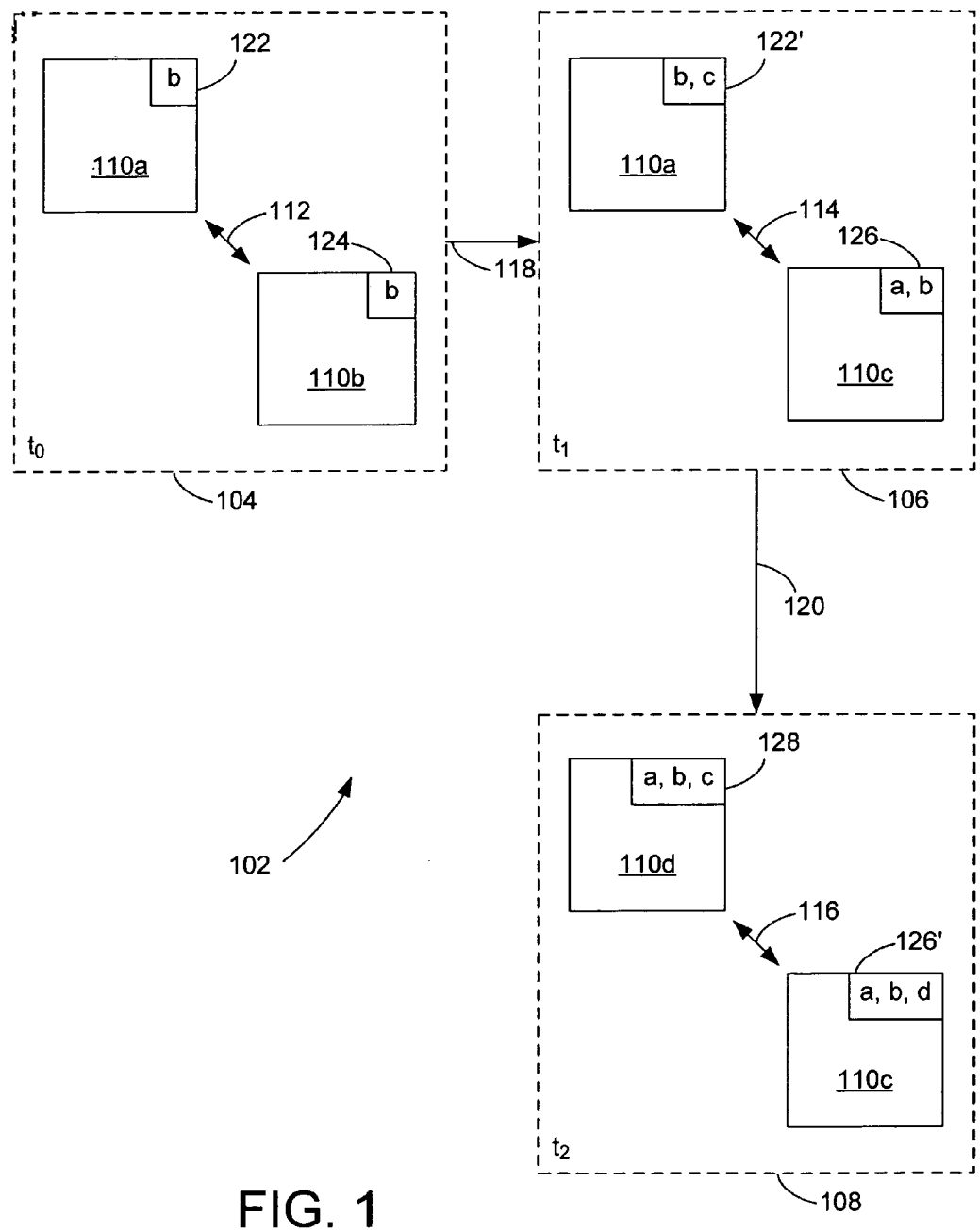
FIG. 1 is a diagram showing information exchange among devices according to the invention.

FIG. 1 is a diagram 102 depicting the information exchange between non-networked clients according to the invention. In the first frame 1 04, indicated as occurring at the time $t_0$, a device 110a has established a piconet with a device 110b, as indicated by the arrow 112. Each of the device 110a and 110b has ad-hoc networking capability, such as that enabled by Bluetooth or 802.11b connectivity. Each device can be a mobile device, such as a wireless phone or a personal digital assistant (PDA) device, or a stationary device, such as a stationary networking beacon. During the piconet, the device 110a and the device 110b exchange information with one another. For example, they may exchange identity information regarding themselves, and other devices with which they previously established piconets. Assuming that they have not previously established piconets with other devices, the device 110a receives information regarding the device 110b, as indicated by the "b" in the box 122, and the device 110b receives information regarding the device 110a, as indicated by the "a" in the box 124.

Once the piconet indicated by the arrow 112 dissolves, such as by either of the device 110a or the device 110b moving out of range from the other device, a second frame 106 is proceeded to, as indicated by the arrow 118. The second frame 106 is indicated as occurring at the time $t_1$. In the second frame 106, the device 110a has established a piconet with the device 110c, as indicated by the arrow 114. The device 110c also has ad-hoc networking capability, and may be a mobile or stationary device. During the piconet, the device 110a and the device 110c exchange information with one another. For example, the device 110a receives information regarding the device 110c, such that it now has information regarding both the devices 110b and 110c, as indicated by the "b" and "c" in the box 122'. The device 110c receives information regarding the devices 110a and 110b from the device 110a, as indicated by the "a" and the "b" in the box 126. This is because the device 110a inherently has information regarding itself, and also passes along the information about the device 110b that it previously obtained in the frame 104.

As a result, the device 110c has information regarding or from the device 110b, even though it has not established a piconet or a scatternet with this device. The device 110a first received the information from the device 110b in the first frame 104, stored this information, and then passed it to the device 110c in the second frame 106. In this manner, the device 110c receives information from the device 110b without having established a network with the device 110b.

Once the piconet indicated by the arrow 114 dissolves, such as by either of the device 110a or the device 110c moving out of range from the other device, a third frame 108 is proceeded to, as indicated by the arrow 120. The third frame 108 is indicated as occurring at the time $t_2$. In the third frame 108, the device 110c has established a piconet with the device 110d, as indicated by the arrow 116. The device 110d also has ad-hoc networking capability, and may be a mobile or a stationary device. During the piconet, the device 110c and the device 110d exchange information with one another. For example, the device 110c receives information regarding the device 110d, such that it now has information regarding the devices 110a, 110b, and 110d, as indicated by the "a", "b", and "d" in the box 126'. The device 110d receives information regarding the devices 110a, 110b, and 110c from the device 110c, as indicated by the "a", "b", and "c" in the box 128. This is because the device 110c inherently has information regarding itself, and also passes along the information about the devices 110a and 110b that it previously obtained in the frame 106. As a result, the device 110d has information regarding or from the devices 110a and 110b, even though it has not established a piconet or a scatternet with either of these devices.

As has been indicated, the information exchanged among the devices in the diagram 102 may be identity information regarding the devices, or more specifically, information regarding the owners or users of these devices. For example, in a shopping mall setting, where the devices are wireless phones, the information may include the names of the users and their phone numbers. The owners of the devices 110a and 110b may pass each other in the mall, such that the piconet 112 is established and information is exchanged, even though the owners do not know each other. Then, when the owners of the devices 110a and 110c pass each other in the mall, the piconet 114 is established, resulting in the device 110c receiving information regarding the device 110b. The owner of the device 110c may know the owner of the device 110b, and thus is alerted to the fact that the owner of the device 110b is also in the mall. For example, a list of people that the owner of the device 110c wishes to be alerted to the presence of, referred to generally as a buddy list, may be maintained on the device 110c. The owner of the device 110b may be on this list, such that when the devices 110a and 110c establish the piconet 110c, the device 110c receives information regarding the device 110b, and alerts its owner.

Other information that may be exchanged includes advertising information. For example, one of the devices of the diagram 102 may be a stationary beacon located in a store in a shopping mall that sends information regarding a sale in the store. The device 110b may be such a stationary device. The owner of the device 110a enters the store, and receives the advertising information. After this person leaves the store, he or she then passes by the owner of the device 110c outside of the store. The device 110c receives the advertising information, even though the owner of this device has not actually entered the store. The device 110c may have preference settings indicating the type of advertising information to which to alert its owner. The owner of the device 110c may therefore learn of a sale at the store regarding something that he or she wanted to buy, even though the owner has not actually visited the store. The invention can be applied to other types of information as well.

Figure 2:
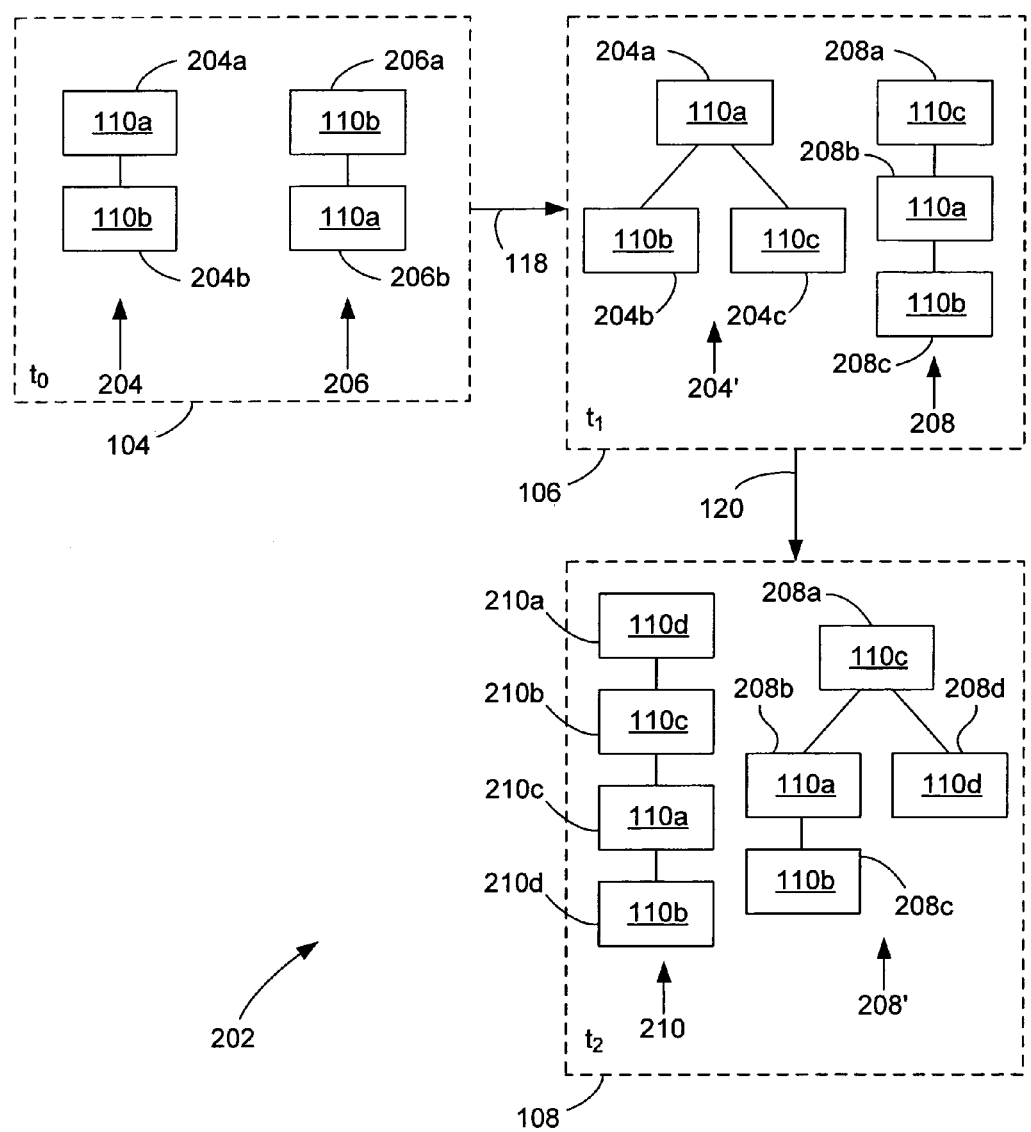
FIG. 2 is a diagram showing how the information exchanged among the devices in FIG. 1 can be stored in trees.

FIG. 2 is a diagram 202 showing a tree data structure that one embodiment uses to store the information exchanged among the devices. The structure may be stored and formatted in a device according to a markup language, such as the extensible Markup Language (XML). The diagram 202 reflects the same piconets that were established in the frames 104, 106, and 108 in FIG. 1. In the frame 104, there is a tree 204 stored at the device 110a, and a tree 206 stored at the device 110b. The top-most node of each tree reflects information regarding the device itself at which the tree is stored. Therefore, the tree 204 has a top node 204a storing information regarding the node 110a, and the tree 206 has a top node 206a storing information regarding the node 110b. When information is exchanged between the devices 110a and 110b in the piconet 112 of FIG. 1, what is exchanged is the nodes of the trees, which are appended to the currently existing trees. Thus, the node 204a of the tree 204 is sent automatically to the device 110b, where it is appended to the tree 206 as the node 206b. Similarly, the node 206a of the tree 206 is sent to the device 110a, where it is appended to the tree 204 as the node 204b.

That the node 204a is sent automatically to the device 110b means that no current configuration of the devices 110a and 110b is required by the users of those devices. For instance, the users may not even be aware that their devices have entered in a piconet with one another, such that the information in the node 204a is sent automatically. As an opposing example, the users do not have to line up corresponding transmitters of their devices, and press corresponding buttons on their devices, in order to effect the sending of the information, as may be required in infrared (IR)-oriented transmission as found in the prior art.

Passage to the next frame 106, as indicated by the arrow 118, results in a further tree exchange. The tree 204 of the device 110a is indicated as the tree 204' in the frame 106. The tree 208 is for the device 110c. Initially, the tree 208 has a single node 208a, reflecting information about itself. During the piconet 114 of FIG. 1, the devices 110a and 110c exchange information. The nodes 204a and 204b are sent to the device 110c, where they are appended to the node 208a as the nodes 208b and 208c. Similarly, the node 208a is sent to the device 110a, where it is appended to the node 204a as the node 204c.

The number of levels down a given node is from the top-most node of a tree indicates how many degrees of separation there are between that node and the mobile device for the tree. For example, the mobile device 110a has directly established contact with the devices 110b and 11c. As a result, the nodes 204b and 204c corresponding to these devices are each directly underneath the node 204a. Conversely, the mobile device 110c has only directly established contact with the device 110a, which itself has established direct contact with the device 110b. As a result, the node 208b, corresponding to the device 110a, is directly underneath the node 208a, whereas the node 208c, corresponding to the device 110b, is a node removed from the node 208a.

In the next frame 108, which is proceeded to after the frame 106 as indicated by the arrow 120, the devices 110c and 110d establish a piconet, which is indicated as the piconet 116 of FIG. 1. The tree 208 of the device 110c is indicated as the tree 208' in the frame 108. The tree 210 is for the device 110d. Initially, the tree 210 has a single node 210a, corresponding to information regarding the device 110d itself. During the information exchange, the nodes 208a, 208b, and 208c are sent to the device 110d, where they are appended to the node 210a as the nodes 210b, 210c, and 210d, respectively. The node 210a is sent to the device 110c, where it is appended to the node 208a as the node 208d.

In the resulting tree 208', that the node 208d is directly connected to the node 208a indicates that the device 110c has established a piconet with the device 110d represented by the node 208d. Similarly, in the tree 210, the order of the nodes 210b, 210c, and 210d, which store information regarding the devices 110c, 110a, and 110b, indicates the level of separation from the device 110d, which is itself indicated by the node 210a. For example, the device 110d has received the information regarding the device 110b of the node 210d because the device 110b networked with the device 110a of the node 210c, which networked with the device 110c of the node 210b, which networked with the device 110d of the node 210a.

Information Decay

Figure 3:
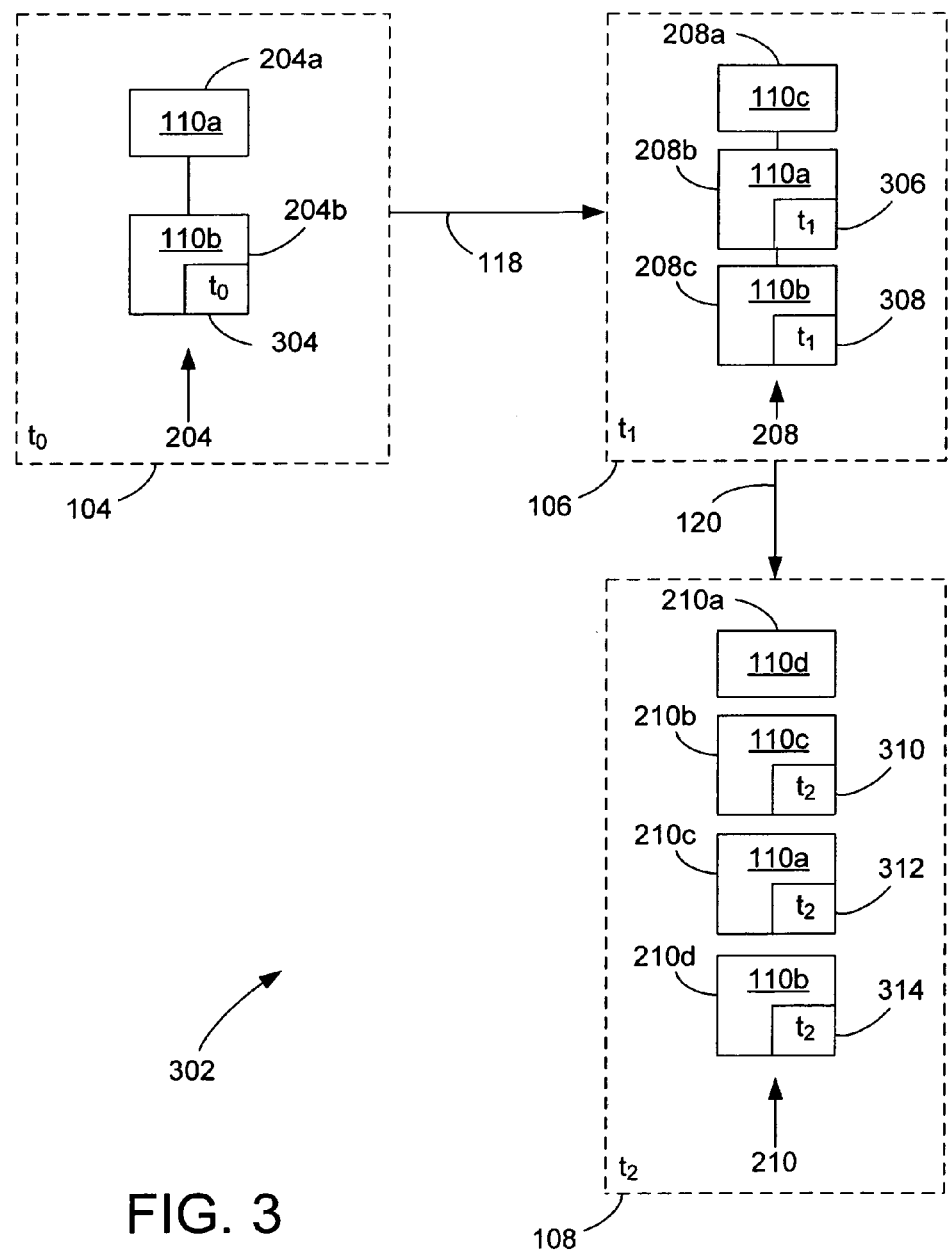
FIG. 3 is a diagram showing how the information stored in the trees of FIG. 2 can decay over time according to one embodiment.
Figure 4:
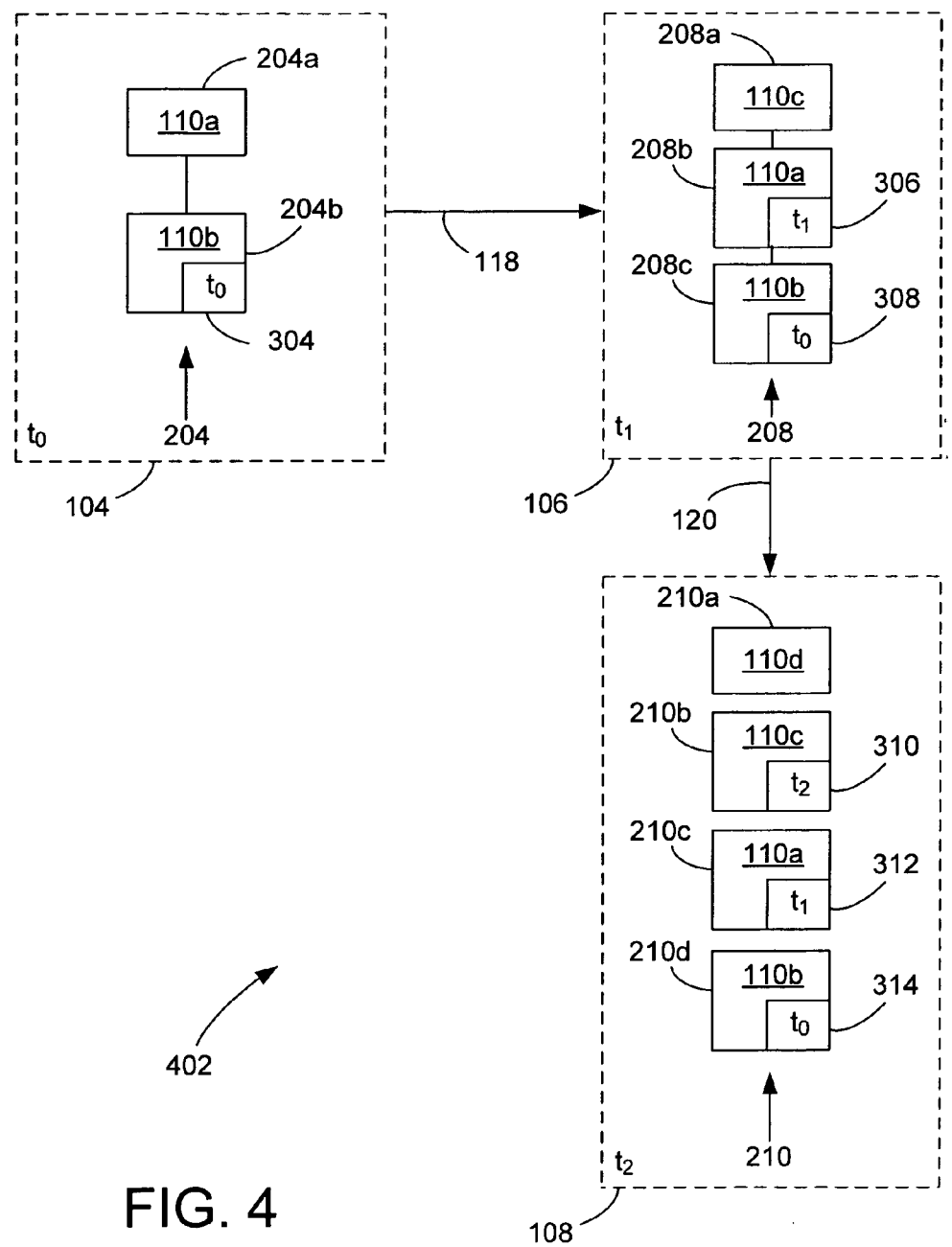
FIG. 4 is a diagram showing how the information stored in the trees of FIG. 2 can decay over time according to another embodiment.

As devices establish piconets with one another to exchange information with one another, the amount of information stored at each device may become unwieldy, and exceed the storage capabilities of the device. Therefore, preferably, the nodes of information stored in a tree of a device decay over time, such that the nodes are automatically deleted as they expire. Two approaches to information decay are shown in FIGS. 3 and 4. In FIG. 3, the information of a node is timestamped with the current time every time it is stored in a new tree. Conversely, in FIG. 4, the information of a node is timestamped only once, when it is first passed to a device. In either situation, when the current time minus the timestamp of a node exceeds a predetermined length of time, the information in the node is said to have decayed, and the node is deleted.

Referring specifically to the diagram 302 of FIG. 3, the frames 104, 106, and 108 correspond to the identically numbered frames of FIGS. 1 and 2. In the first frame 104, only the tree 204, which is stored at the device 110a, is specifically shown for illustrative and explanatory purposes. The node 204a corresponds to the device 110a, and does not have a timestamp, such that it never expires, and is never deleted. The node 204b, however, has a timestamp 304, indicating that the information in the node 204b was first stored in the tree 204 at the time $t_0$. When the current time minus the time $t_0$ exceeds a predetermined threshold, the node 204b will be deleted.

Following the arrow 118, in the second frame 106, only the tree 208, which is stored at the device 110c, is specifically shown for illustrative and explanatory purposes. The node 208a corresponds to the device 11c, and does not have a timestamp, so that it never expires or is deleted. The nodes 208b and 208c, as have been described, result from the copying of the nodes 204a and 204b into the tree 208 during the piconet between the device 110c and the device 110a. The nodes 208a and 208b have timestamps 306 and 308, respectively, each indicating that the information stored therein was first stored in the tree 208 at the time $t_1$. When the current time minus the time $t_1$ exceeds the predetermined threshold, these nodes will be deleted. It is noted that the timestamp 308 of the node 208c differs from the timestamp 304 of the node 204b, even though the node 204b of the tree 204 was copied to the tree 208 as the node 208c. This is because the timestamps in the approach of FIG. 3 indicate when a given device first received information stored in a node. The device 110a first received the information stored in the node 204b at the time $t_0$, such that the timestamp 304 reflects this. Similarly, the device 110c first received the information stored in the node 208c at the time $t_1$, such that the timestamp 308 reflects this.

Following the arrow 120, in the third frame 108, only the tree 210, which is stored at the device 110d, is specifically shown for illustrative and explanatory purposes. The node 210a corresponds to the device 110d, and does not have a timestamp, such that it will never expire or be deleted. The nodes 210b, 210c, and 210d, as have been described, result from the copying of the nodes 208a, 208b, and 208c into the tree 210 during the piconet between the devices 110d and 110c. The nodes 210b, 210c, and 210d have timestamps 310, 312, and 314, respectively, each indicating that the information stored therein was first stored in the tree 210 at the time $t_2$. The timestamps 306 and 308 of the nodes 208b and 208c differ from the timestamps 312 and 314 of the nodes 210c and 210d, even though the nodes 208b and 208c of the tree 208 were copied to the tree 210 as the nodes 210c and 210c. This is because the device 110c first received the information stored in the nodes 208b and 208c at the time $t_1$, whereas the device 110d first received the information stored in the nodes 210c and 210d at the time $t_2$.

Referring next to the diagram 402 of FIG. 4, the approach to timestamping shown in FIG. 4 differs from that shown in FIG. 3. The frames 104, 106, and 108 of FIG. 4 correspond to the identically numbered frames of FIGS. 1, 2, and 3. In the first frame 104, only the tree 204, stored at the device 110a, is specifically shown for illustrative and explanatory purposes. The node 204a corresponds to the device 110a, and does not have a timestamp. The node 204b, however, has a timestamp 304, indicating that the information regarding the device 110b in the node 204b was first passed from the device 110b at the time $t_0$. That is, the information in the node 204b was sent from the device 110b during the piconet established between the devices 110a and 110b at the time $t_0$, as has been described.

Following the arrow 118, in the second frame 106, only the tree 208, which is stored at the device 110c, is specifically shown for illustrative and explanatory purposes. The node 208a corresponds to the device 110c, and does not have a timestamp. The nodes 208b and 208c result from copying of the nodes 204a and 204b into the tree 208 during the piconet between the device 110c and the device 110a. The node 208c has a timestamp 308 that retains the timestamp 304 of the node 204b from which it was copied. That is, the timestamp 308 indicates the time $t_0$ when the information regarding the device 110b was received by the device 110a at the time $t_0$ in the frame 104, and not when the information was received by the device 110c at the time $t_1$ in the frame 106.

The timestamps in the timestamping approach of FIG. 4 indicate when information regarding a device was directly communicated from that device to another device. The device 110c did not receive the information regarding the device 110b directly from the device 110b, but rather received it from the device 110a, such that the timestamp 308 reflects when the device 110a received the information from the device 110b. The timestamp 306 indicates the time $t_1$, which is the time at which the device 110c received the information regarding the device 110a from the device 110a.

Following the arrow 120, in the third frame 108, only the tree 210, which is stored at the device 110d, is specifically shown for illustrative and explanatory purposes. The node 210a corresponds to the device 110d, and does not have a timestamp. The nodes 210b, 210c, and 210d result from the copying of nodes 208a, 208b, and 208c into the tree 210 during the piconet between the device 110d and the device 110c. The nodes 210c and 210d have timestamps 312 and 314 that retain the timestamps 306 and 308 of the nodes 208b and 208c, respectively, from which they were copied. This is unlike the approach of FIG. 3, in which the timestamps 312 and 314 are updated to reflect when the information having these timestamps were stored in the tree 210. In the approach of FIG. 4, the timestamps 312 and 314 retain the timestamps 306 and 308 of the nodes 208b and 208b from which they were copied. Therefore, the timestamps 312 and 314 indicate the times $t_1$ and $t_0$, respectively. The timestamp 310 of the node 210b indicates the time $t_2$.

Mobile and Stationary Devices

Figure 5:
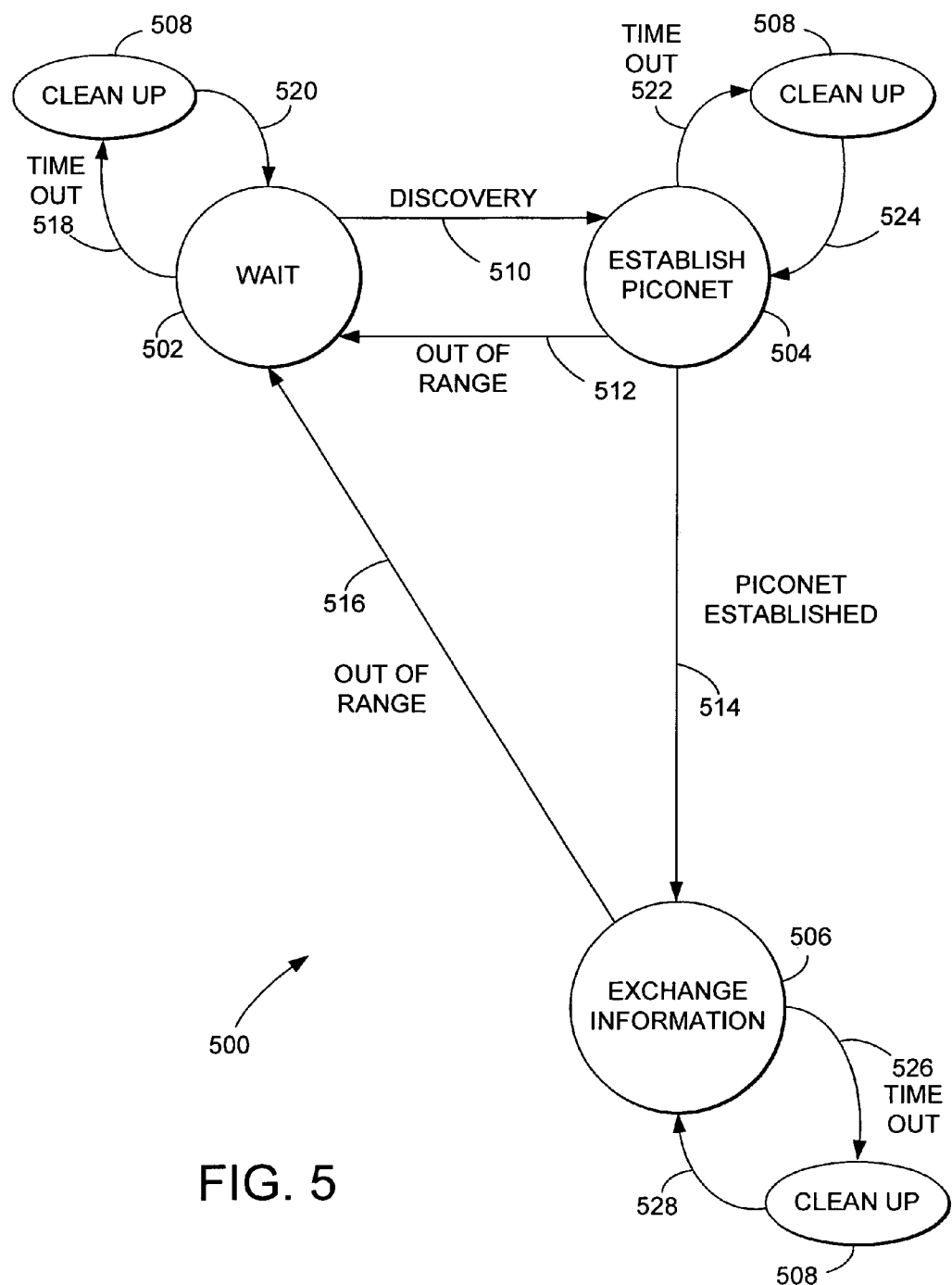
FIG. 5 is a state diagram showing the general approach of information exchange according to the invention.

The devices of FIGS. 1, 2, 3, and 4 exchange information with one another generally in accordance with the state diagram 500 of FIG. 5. There are four states, an initial wait state 502, an establish piconet state 504, an exchange information state 506, and a clean up state 508, which is repeated three times in FIG. 5 for illustrative clarity. In the wait state 502, a device waits for one of two conditions to occur. First, one or more nodes can time out, as indicated by the arrow 51 8, such that the clean up state 508 is proceeded to so that the timed out, or decayed, nodes can be deleted. The wait state 502 is then proceeded back to as indicated by the arrow 520. Second, another device in range can be discovered as indicated by the arrow 510, such that a piconet is established in the state 504.

In the establish piconet state 504, a piconet is established with the device that was discovered. From the establish piconet state 504, three conditions can occur. First, the device with which the piconet is being established can go back out of range, as indicated by the arrow 512, such that the wait state 502 is again proceeded to. Second, one or more nodes can time out, as indicated by the arrow 522, such that the clean up state 508 is proceeded to so that the timed out nodes can be deleted. The establish piconet state 504 is then proceeded back to as indicated by the arrow 524. Finally, once the piconet has been established, as indicated by the arrow 514, the exchange information state 506 is proceeded to.

In the exchange information state 506, information is established with the device with which a piconet has been established. From the exchange information state 506, two conditions can occur. First, once the device with which a piconet has been established is again out of range, as indicated by the arrow 516, the wait state 502 is again proceeded to. Second, one or more nodes can time out, as indicated by the arrow 526, such that the clean up state 508 is proceeded to so that the timed out nodes are deleted. The exchange information state 506 is then proceeded back to as indicated by the arrow 528.

A given device can be configured so that it only sends information to other devices, only receives information from other devices, or both sends information to and receives information from other devices. The first configuration is referred to as a send-only configuration, the second configuration is referred to as a receive-only configuration, and the third configuration is referred to as a send-and-receive configuration. Furthermore, the first and third configurations are generally referred to as sending configurations, whereas the second and third configurations are generally referred to as receiving configurations.

Figure 6:
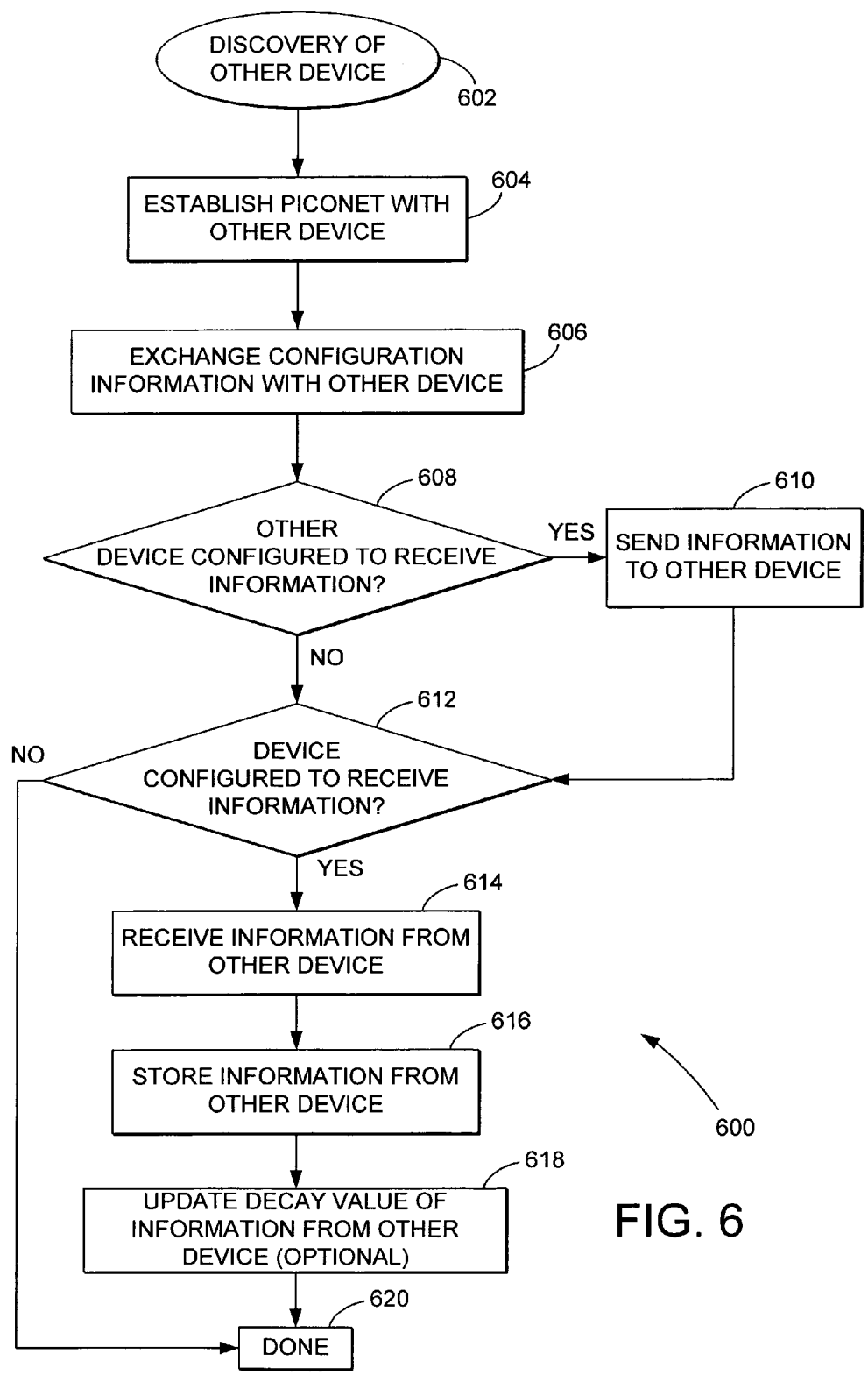
FIG. 6 is a flowchart of a method showing a more particular approach of information exchange according to the invention.

FIG. 6 shows a flowchart 600 of a more specific method that a device can perform to achieve information exchange according to the invention, which takes into account the configuration of the device. When another device has been discovered (602), a piconet is established with that device (604). Configuration information is then exchanged (606), so that the device performing the method learns the configuration of the other device, and vice-versa. If the other device is configured to receive information (608), then information is sent to the device (610). If the device performing the method is configured to receive the information (614), then information is received from the other device (616). This information is then stored, such as in a tree structure in accordance with a markup language (616), and the decay value of the information received is optionally updated (618). The updating of the decay value of the information is consistent with the approach of FIG. 3. Conversely, if the decay value of the information is retained as has been received, such that 618 is not performed, then this is consistent with the approach of FIG. 4. The method then is finished (620).

Figure 7:
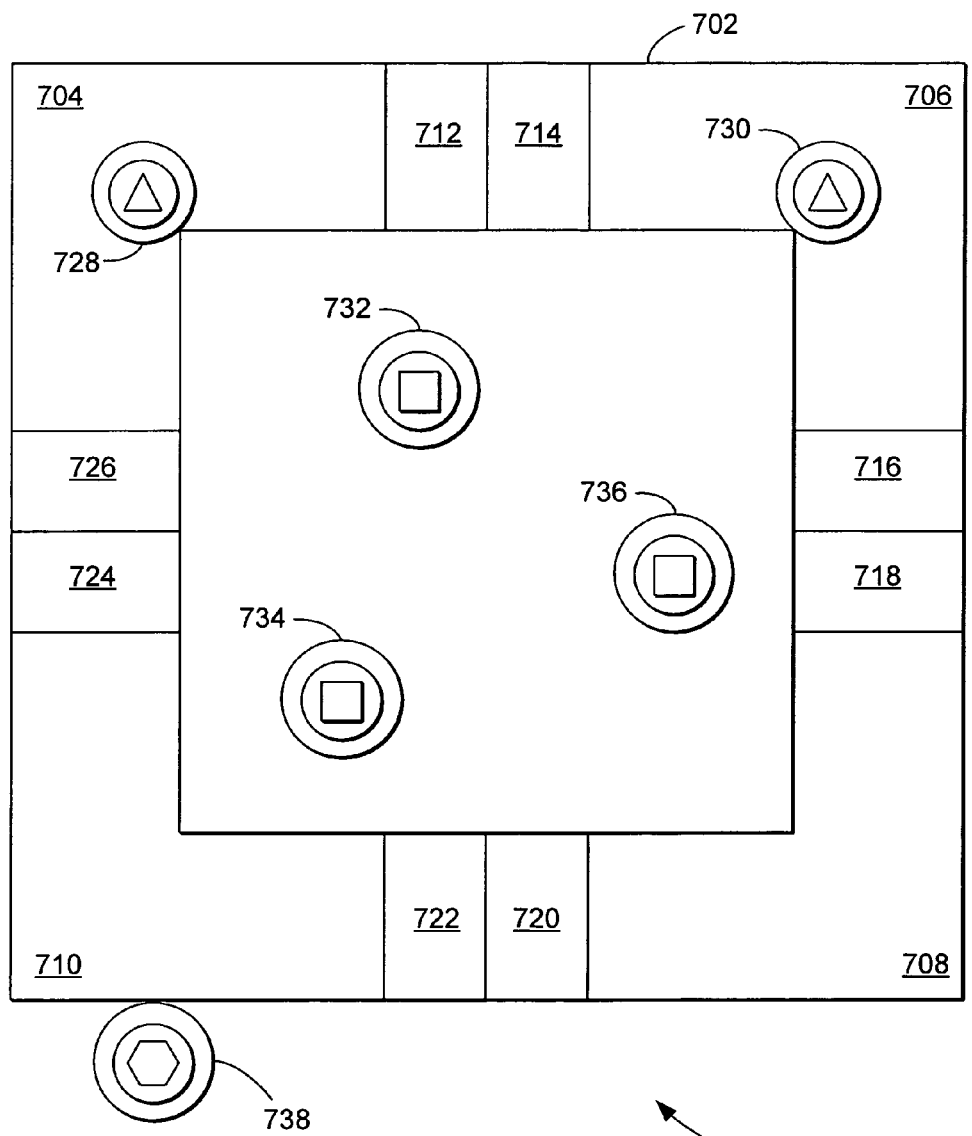
FIG. 7 is a diagram showing both stationary and mobile devices that can exchange information according to the invention.

An example environment in which the devices that have been described can operate is shown in the diagram 700 of FIG. 7, which is a diagram of a shopping mall 702. The shopping mall has corner stores 704, 706, 708, and 710, and other stores 712, 714, 716, 718, 720, 722, 724, and 726. There are stationary beacon devices 728 and 730 in the stores 704 and 706, respectively. These devices 728 and 730 operate in send-only configurations, and are not mobile. As mobile devices come into range, the devices 728 and 730 can send information to them regarding in-store promotions, and other types of advertising information.

Three mobile devices 732, 734, and 736 are also shown. Each of these devices 732, 734, and 736 may be a wireless phone, for example, and may operate in any of the configurations that have been described. They may exchange information with each other, and/or receive information from the stationary devices 728 and 730. Finally, there is a stationary repeater device 738 located outside of the shopping mall. The device 738 is configured to amplify information received from any of the mobiles devices 732, 734, and 736 that come into range to outside of the mall, over a larger range than what the devices 732, 734, and 736 can achieve themselves. In this way, information is disseminated over a larger area, such as over the parking lot of the mall, for instance.

Figure 8:
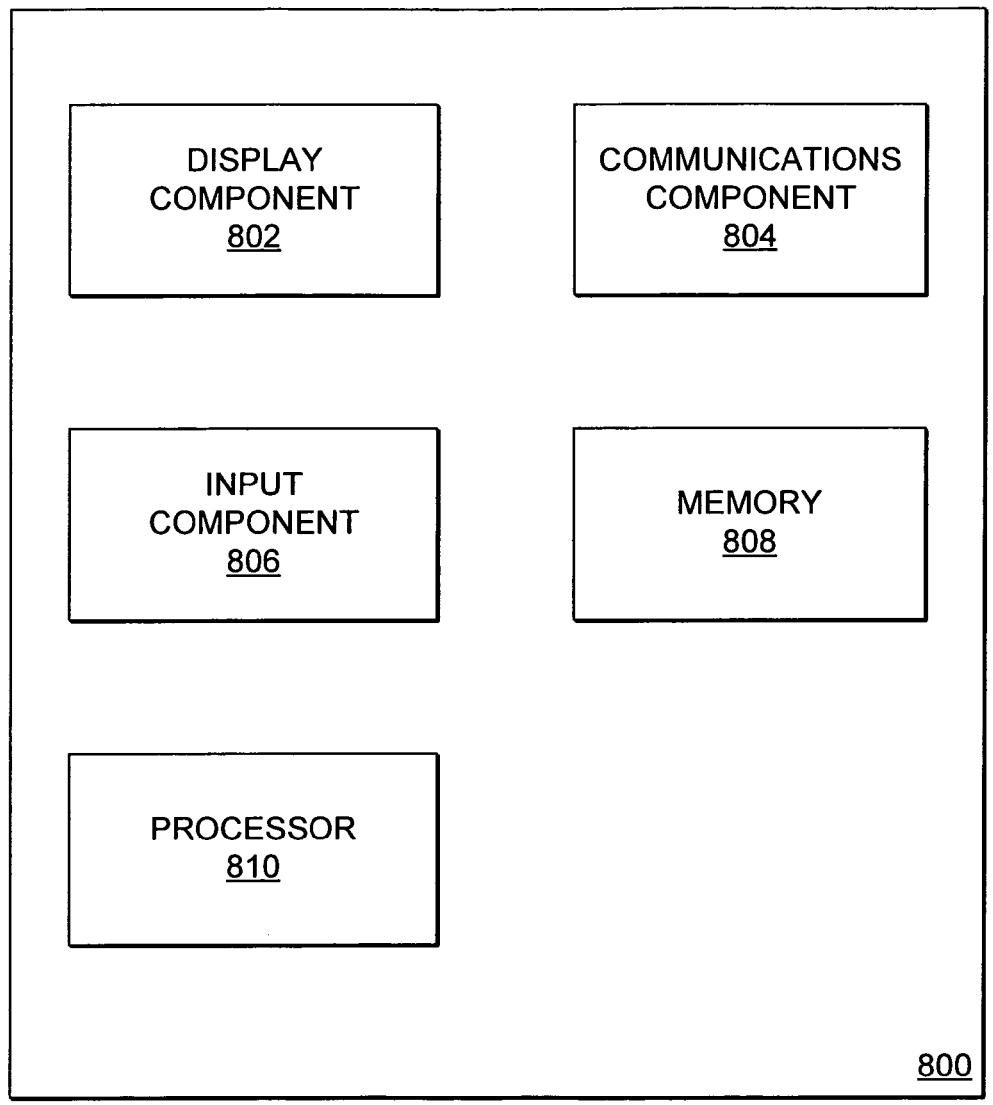
FIG. 8 is a block diagram of a representative device in accordance with which the invention may be implemented.

Finally, FIG. 8 depicts a block diagram of an example device 800 that may implement the mobile and stationary devices that have been described. The example device 800 is shown as having the following components: a display component 802, a communications component 804, an input component 806, a memory 808, and a processor 810. The device 800 may, however, not have all these components, and may have other components in addition to or in lieu of the components shown in FIG. 8. The device 800 is only one example of a suitable device and is not intended to suggest any limitation as to the scope of use or functionality of the invention. Neither should the device 800 be interpreted as having any dependency or requirement relating to any one or combination of components illustrated.

The invention is operational with numerous other general purpose or special purpose computing system environments or configurations. Examples of well known computing systems, environments, and/or configurations that may be suitable for use with the invention include, but are not limited to, personal computers, server computers, handheld or laptop devices, multiprocessor systems, microprocessor systems. Additional examples include wireless phones, personal digital assistance (PDA) devices, set top boxes, programmable consumer electronics, network PCs, minicomputers, mainframe computers, distributed computing environments that include any of the above systems or devices, and the like.

The invention may be described in the general context of computer instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Depending on the exact configuration and type of the device 800, the memory 808 may be volatile (such as RAM), non-volatile (such as ROM, flash memory, etc.) or some combination of the two. Additionally, the device 800 may also have additional features/functionality. For example, the device 800 may also include additional storage (removable and/or non-removable) including, but not limited to, magnetic or optical disks or tape.

Computer storage media includes volatile, nonvolatile, removable, and non-removable media implemented in any method or technology for storage of information such as computer readable instructions, data structures, program modules, or other data. Memory 808, removable storage, and non-removable storage are all examples of computer storage media. Computer storage media includes, but is not limited to, RAM, ROM, EEPROM, flash memory or other memory technology, CDROM, digital versatile disks (DVD) or other optical storage, magnetic cassettes, magnetic tape, magnetic disk storage or other magnetic storage devices, or any other medium which can be used to store the desired information and which can accessed by device 800. Any such computer storage media may be part of device 800. There may be one or more processors 810, which can execute programs stored on the storage devices.

Device 800 may also contain the communications component 800 that allow the device to communicate with other devices. The communications component 800 is an example of communication media. Communication media typically embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media. The component 800 itself may implement Bluetooth connectivity, 802.11*b* connectivity, or another type of connectivity.

Device 800 may also have at least one input component 806 such as keyboard, mouse, pen, sound input device (such as a microphone), touch input device, etc. The display component 802 may be a flat panel display, or another type of display.

The approaches that have been described can be computer-implemented methods on the device 800. A computer-implemented method is desirably realized at least in part as one or more programs running on a computer. The programs can be executed from a computer-readable medium such as a memory by a processor of a computer. The programs are desirably storable on a machine-readable medium, such as a floppy disk or a CD-ROM, for distribution and installation and execution on another computer. The program or programs can be a part of a computer system, a computer, or a computerized device.

CONCLUSION

It is noted that, although specific embodiments have been illustrated and described herein, it will be appreciated by those of ordinary skill in the art that any arrangement is calculated to achieve the same purpose may be substituted for the specific embodiments shown. This application is intended to cover any adaptations or variations of the present invention. Therefore, it is manifestly intended that this invention be limited only by the claims and equivalents thereof.

The invention claimed is:

1. A method comprising:
   establishing an instantaneous network between a first mobile device and a second mobile device, each mobile device having ad hoc networking capability;
   sending first information in a nodal tree structure from the first mobile device to the second mobile device automatically, the first information including at least information received by the first mobile device from one or more third devices other than the first mobile device and the second mobile device during at least one instantaneous network previously established between the first mobile device and the one or more third devices; and,
   storing the first information at the second mobile device in a second tree data structure;
   wherein the first mobile device is not part of the at least one instantaneous network previously established between the first mobile device and the one or more third devices during the establishing and the sending; and
   wherein the second tree data structure has multiple nodes such that a number of levels in the second tree data structure between two nodes of the multiple nodes indicates a degree of separation between two devices that are represented by the two nodes.

2. The method of claim 1, wherein the instantaneous network between the first mobile device and the second mobile device is a piconet.

3. The method of claim 1, flirther comprising:
   sending second information in a nodal tree structure from the second mobile device to the first mobile device automatically, the second information including at least information received by the second mobile device from one or more fourth devices other than the first mobile device and the second mobile device during at least one instantaneous network previously established between the second mobile device and the one or more fourth devices; and,
   storing the second information at the first mobile device in a first tree data structure in which the first information has already been stored.

4. The method of claim 3, wherein the first information is stored at the second mobile device in the second tree data structure in which the second information has already been stored.

5. A method comprising:
   establishing an instantaneous network between a first mobile device and a second mobile device, each mobile device having ad hoc networking capability;
   sending first information from the first mobile device to the second mobile device automatically, the first information including at least information received by the first mobile device from one or more third devices other than the first mobile device and the second mobile device during at least one instantaneous network previously established between the first mobile device and the one or more third devices; and,
   storing the first information at the second mobile device in a second tree data structure;
   wherein the first mobile device is not part of the at least one instantaneous network previously established between the first mobile device and the one or more third devices during the establishing and the sending first information;
   further comprising:
   sending second information from the second mobile device to the first mobile device, the second information including at least information received by the second mobile device from one or more fourth devices other than the first mobile device and the second mobile device during at least one instantaneous network previously established between the second mobile device and the one or more fourth devices; and,
   storing the second information at the first mobile device in a first tree data structure in which the first information has already been stored
   wherein the first information is stored at the second mobile device in the second tree data structure in which the second information has already been stored; and
   wherein each of the first tree data structure at the first mobile device and the second tree data structure at the second mobile device indicate how many degrees of separation there are between given nodes stored in the first and second tree data structures and nodes representing the first and second mobile devices, respectively.

6. The method of claim 1, wherein the first information includes identity information regarding each of the one or more third devices and identity information regarding the first mobile device.

7. The method of claim 1, wherein the first information includes one or more of: advertising information and dating information.

8. The method of claim 1, wherein each node of the nodal tree structure of the first information contains an associated decay value, such that information contained in the node decays over time and the node is deleted upon expiration.

9. The method of claim 8, wherein storing the first information at the second mobile device comprises copying each node of the first information into the second tree data structure, including the associated decay value contained in the node.

10. The method of claim 8, wherein storing the first information at the second mobile device comprises copying each node of the first information into the second tree data structure, and updating the associated decay value contained in the node.

11. The method of claim 1, wherein at least one of the one or more third devices is a mobile device.

12. The method of claim 1, wherein at least one of the one or more third devices is a stationary device.

13. The method of claim 1, wherein the first information decays over time, such that the first information is deleted upon expiration.

14. The method of claim 1, wherein the first information is formatted according to a markup language.

15. A computer-readable medium having instructions stored thereon for execution by a processor of a first device having ad hoc networking capability to perform a method comprising:
  establishing an instantaneous network with a second device having ad hoc networking capability;
  exchanging configuration information with the second device, each of the first device and the second device having a current configuration selected from at least a send-only configuration and a send-and-receive configuration;
  in response to determining that the current configuration of the second device is the send-and-receive configuration, automatically
    sending first information in a nodal tree structure to the second device, the first information including at least information received by the first device from one or more third devices other than the first device and the second device during at least one instantaneous network previously established between the first device and the one or more third devices; and, in response to determining that the current configuration of the first device is the send-and-receive configuration, automatically
    receiving second information in a nodal tree structure from the second device;
    storing the second information in a first tree data structure;
  wherein the first device is not part of the at least one instantaneous network previously established between the first device and the one or more third devices during the establishing, the exchanging, and the sending; and
  wherein the first tree data structure has multiple nodes such that a number of levels in the first tree data structure between two nodes of the multiple nodes indicates a degree of separation between two devices that are represented by the two nodes.

16. The computer-readable medium of claim 15, wherein the instantaneous network established with the second device is a piconet.

17. The computer-readable medium of claim 15, wherein the second information includes at least information received by the second device from one or more fourth devices other than the first device and the second device during at least one instantaneous network previously established between the second device and the one or more fourth devices.

18. The computer-readable medium of claim 15, wherein the first information has already been stored in the first tree data structure.

19. The computer-readable medium of claim 15, wherein each node of the nodal tree structures of the first information and the second information contains an associated decay value, such that information contained in the node decays over time and the node is deleted upon expiration.

20. The computer-readable medium of claim 19, wherein storing the second information in the first tree data structure comprises copying each node of the second information into the first tree data structure, including the associated decay value contained in each node.

21. The computer-readable medium of claim 19, wherein storing the second information in the first tree data structure comprises copying each node of the second information into the first tree data structure, and updating the associated decay value contained in each node.

22. The computer-readable medium of claim 15, wherein at least one of the first device and the second device is a mobile device.

23. The computer-readable medium of claim 15, wherein at least one of the first device and the second device is a stationary device.

24. The computer-readable medium of claim 15, wherein the first device has Bluetooth communication capability that enables the ad hoc networking capability.

25. The computer-readable medium of claim 15, wherein the first device has 802.11b communication capability that enables the ad hoc networking capability.

26. A device comprising:
  a communications component enabling ad hoc networking capability;
  a memory storing a computer program to establish an instantaneous network with a second device using the ad hoc networking capability, to automatically send first infonnation in a nodal tree structure from a first tree data structure stored in the memory where the second device has a receiving configuration, and to automatically receive second information in a nodal tree structure from the second device and store the second information in the first tree data structure where the device has a receiving configuration; and,
  a processor executing the computer program from the memory, the first information including at least information received by the device from one or more third devices other than the device and the second device during at least one instantaneous network previously established between the device and the one or more third devices;
  wherein the device is not part of the at least one instantaneous network previously established between the device and the one or more third devices when the first information is sent from the first tree data structure stored in the memory or when the second information is received from the second; and
  wherein the first tree data structure has multiple nodes such that a number of levels in the first tree data structure between two nodes of the multiple nodes indicates a degree of separation between two devices that are represented by the two nodes.

27. The device of claim 26, wherein the instantaneous network established with the second device is a piconet.

28. The device of claim 26, wherein the device is a mobile device selected from a group of mobile devices comprising: a wireless phone and a personal-digital assistant (PDA) device.

29. The device of claim 26, wherein each node of the nodal tee structures of the first information and the second information contains an associated decay value, such that information contained in the node decays over time and the node is deleted upon expfration.

30. The device of claim 26, further comprising one or more of:
an input component, and a display component.

31. A method for communicating information from a first device to a second mobile device via an intermediary mobile device, each of the first device, the second mobile device and the intermediary mobile device having ad hoc networking capability, the method comprising:
providing a first ad hoc network including at least the first device and the intermediary mobile device;
automatically transmitting information in a nodal tree structure from the first device to the intermediary mobile device though the first ad hoc network through which the information is provided from the first device to the intermediary mobile device;
storing the information in an intermediary tree data structure at the intermediary mobile device;
permitting the first ad hoc network to dissipate at least with respect to the intermediary mobile device;
establishing, after the permitting, a second ad hoc network including at least the intermediary mobile device and the second mobile device; and,
automatically sending the information from the intermediary tree data structure at the intermediary mobile device to the second mobile device;
wherein the intermediary tree data structure has multiple nodes such that a number of levels in the intermediary tree data structure between two nodes of the multiple nodes indicates a degree of separation between two devices that are represented by the two nodes.

32. A mobile device that is capable of acting as an intermediary and that is configured to enable it to perform actions comprising:
establishing a first instantaneous network including at least the intermediary mobile device and a second mobile device;
automatically receiving information in a nodal tree structure at the intermediary mobile device from the second mobile device via the first instantaneous network;
storing the information in an intermediary tree data structure at the intermediary mobile device;
terminating the first instantaneous network at least with respect to the second mobile device;
establishing, after the terminating action, a second instantaneous network including at least the intermediary mobile device and a third mobile device; and,
automatically sending, after the establishing a second instantaneous network action, the information in a nodal tree structure from the intermediary tree data structure at the intermediary mobile device to the third mobile device via the second instantaneous network;
wherein the intermediary tree data structure has multiple nodes such that a number of levels in the intermediary tree data structure between two nodes of the multiple nodes indicates a degree of separation between two devices that are represented by the two nodes.

33. The mobile device of claim 32, wherein the information in the nodal tree structure includes multiple nodes representing multiple devices, including an intermediary node representing the intermediary mobile device and a second node representing the second mobile device; and wherein the intermediary node comprises a top-most node of the intermediary tree data structure and the second node is directly connected to the intermediary node to indicate that the intermediary mobile device directly communicated with the second mobile device.

34. The mobile device of claim 32, wherein the information comprises identity information of the second mobile device.

35. The mobile device of claim 32, wherein the information is directed to at least one node comprising the second mobile device, the information including an associated decay value such that the information about the second mobile device decays over time and the information about the second mobile device may be deleted upon expiration of the associated decay value.

36. The mobile device of claim 32, wherein the information compnses one or more of: advertising information and dating information.

37. The computer-readable medium of claim 15, wherein a number of levels down a given node is from a top-most node of the first tree data structure indicates how many degrees of separation there are between a given device represented by the given node and the first device.

38. The device of claim 29, wherein a number of levels down from a top-most node of the first tree data structure that a particular node representing a particular device of the one or more third devices is indicates how many degrees of separation there are between the particular device and the device.

39. The method of claim 31, further comprising:
storing the information in a second tree data structure at the second mobile device;
wherein the second tree data structure has multiple nodes such that a number of levels in the second tree data structure between two nodes of the multiple nodes indicates a degree of separation between two devices that are represented by the two nodes.

40. The mobile device of claim 32, wherein a top-most node of the intermediary tree data structure represents the intermediary mobile device; and wherein a number of levels that a particular node representing a particular device is down from the top-most node indicates how many degrees of separation there are between the intermediary mobile device and the particular device.

* * * * *